United States Patent Office 3,374,237
Patented Mar. 19, 1968

3,374,237
1 - PHENYL - 3 - (4 - PHENYL-1-PIPERAZINO-ALKYL)-IMIDAZOLIDINONES AND IMIDAZOLIDINETHIONES
William Blythe Wright, Jr., Woodcliff Lake, N.J., and Herbert Joseph Brabander, Nanuet, N.Y., assignors to American Cyanamid Company, Stamford, Conn., a corporation of Maine
No Drawing. Filed May 21, 1965, Ser. No. 457,862
19 Claims. (Cl. 260—268)

ABSTRACT OF THE DISCLOSURE

The preparation of imidazolidinones and imidazolidinethiones having a phenyl or substituted phenyl group in the 1-position and 4-phenyl or substituted phenyl-1-piperazinyl lower alkylene groups in the 3-position. The phenyl groups may have substituents such as halogen, lower alkyl, lower alkoxy or trifluoromethyl present. These compounds are useful as tranquilizers.

---

In the past, imidazolidinones and imidazolidinethiones have been described which have aryl groups on one or both of the nitrogen atoms, however, none have been found which contain an aryl group on one nitrogen and a (4-phenyl-1-piperazinyl)alkyl group on the other nitrogen of the heterocyclic basic ring structure.

We have now found that compounds which have the following structure are highly active physiologically:

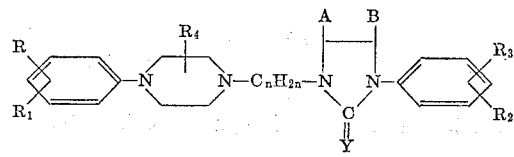

wherein R, $R_1$, $R_2$, and $R_3$ are selected from the group consisting of hydrogen, halogen, lower alkyl, lower alkoxy and trifluoromethyl, $R_4$, A and B are selected from the group consisting of hydrogen and lower alkyl, Y is selected from the group consisting of oxygen and sulfur, $n$ is an integer from 2 to 4 and pharmaceutically acceptable acid addition salts of the above compounds.

The compounds of the present invention may be solids or liquids at room temperature in the form of their free bases. As such, they are relatively insoluble in water but are soluble in or miscible with most organic solvents such as, for example, lower alkyl alcohols, esters, acetone, chloroform and the like. These compounds form acid addition salts with strong acids such as hydrochloric acid, sulfuric acid, perchloric acid and the like. These salts are, in general, soluble in water, methanol, ethanol, etc. but relatively insoluble in benzene, ether, petroleum-ether and the like.

The present compounds have been found to have tranquilizing properties which show a desirable therapeutic index i.e., wide-spread between the doses producing sedative action and toxic symptoms such as paralysis or lethality.

The compounds of this invention may be prepared by the following method which has been found most desirable

1.

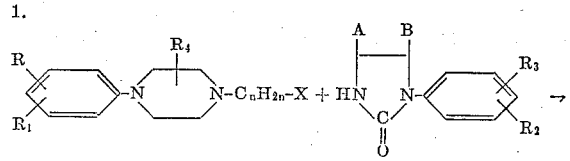

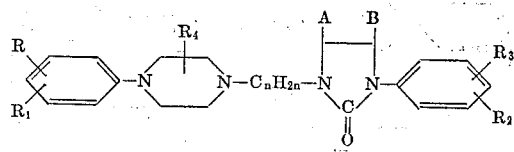

wherein R, $R_1$, $R_2$, $R_3$, $R_4$, A, B and $n$ are as defined above and X is a reactive halogen or arylsulfonyloxy radical. The substituted imidazolidinone starting material is dissolved in an inert solvent such as, for example, dimethylene glycol dimethyl ether (diglyme) and reacted with a condensing agent such as sodium hydride and then with an appropriate aminoalkyl halide. The reaction is best carried out at temperatures in the range of 30°–200° C. for a period of from 30 minutes to 4 hours. The product can be recovered by methods well known in the art and described hereinafter in the examples.

The compounds of the present invention can also be prepared by several other methods, one group of which have in common the cyclization of a straight chain compound to produce the desired imidazolidinone ring structure with the substituents present thereof. One method found useful in producing the compounds of the present invention is the cyclization of substituted carbanilates which can be illustrated by the following reaction.

2.

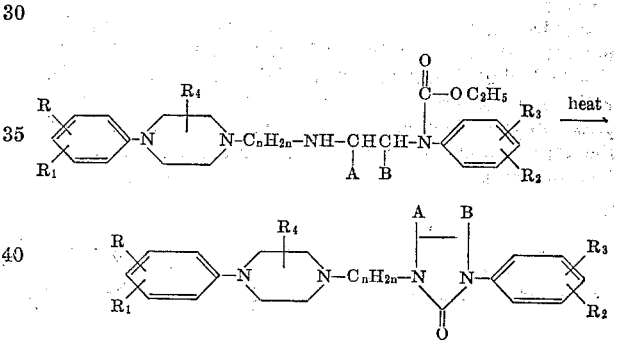

wherein R, $R_1$, $R_2$, $R_3$, $R_4$, A, B and $n$ are as defined above hereinbefore.

The present compounds can also be prepared by the cyclization of N-substituted (aminoalkyl) ureas. This reaction can be illustrated as follows:

3.

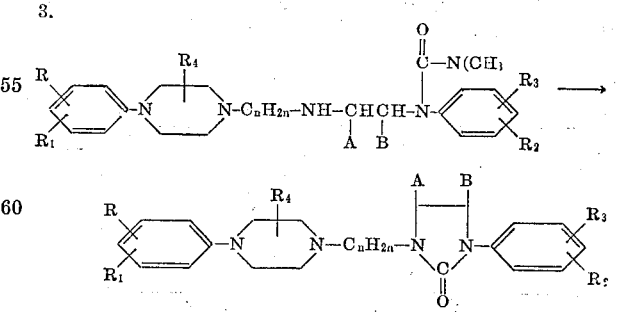

in which R, $R_1$, $R_2$, $R_3$, $R_4$, A, B and $n$ are as defined hereinbefore. The starting material, namely, N-(substituted aminoalkyl)ureas can be prepared by the various methods described in the chemical literature.

Other methods of preparing the compounds of the present invention can be illustrated as follows:

4.
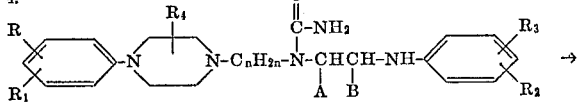
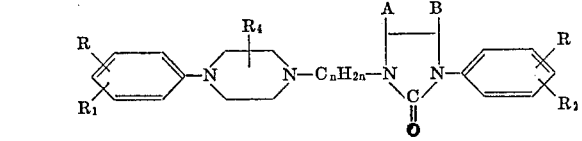

5.
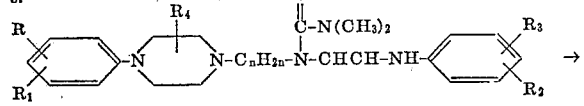
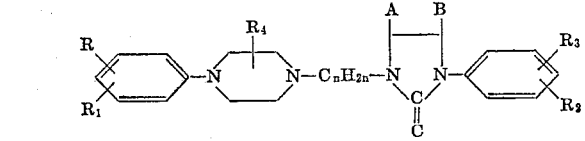

in which R, R₁, R₂, R₃, R₄, A, B and *n* are as defined above.

The various cyclization reactions illustrated above can be carried out, for example, by heating the reagents alone or in the presence of a solvent inert to the reactants at a temperature within the range of about 100° C. to about 250° C. for a period of from about 30 minutes to about 10 hours.

Further methods of preparing the compounds of the present invention can be used, such as, the reaction of N - (substituted aminoalkylene)-N'-arylalkylenediamines with cyclizing agents such as ethyl chloroformate, phosgene, ethyl carbonate and the like. The preparation of the present compounds by this latter method can be illustrated as follows:

6.
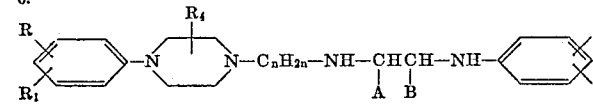
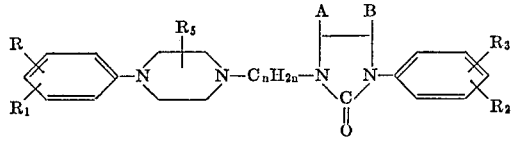

in which R, R₁, R₂, R₃, R₄, A, B and *n* are as defined hereinbefore.

A still further method for preparing compounds of the present invention can be illustrated as follows:

7.
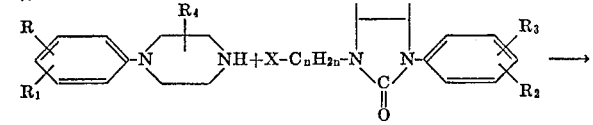
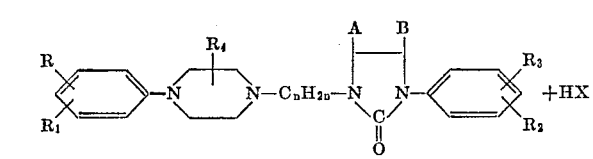

wherein R, R₁, R₂, R₃, R₄, A, B and *n* are as defined above and X is a reactive halogen or arylsulfonyloxy radical. The reaction conditions do not appear to be critical. The alkylating agent (containing X) is reacted with the amine in excess or in the presence of an acid acceptor such as sodium or potassium carbonate, sodium hydroxide, pyridine and the like. The reaction is preferably carried out in the presence of an excess of the amine or in a solvent such as benzene, toluene, ethanol, acetone and the like. The reaction is best carried out within the range of about 20° C. to about 150° C. for a period from about 30 minutes to several hours. The product can be recovered by methods well known in the art and as described hereinafter in the examples.

The corresponding imidazolidinethiones are also a part of this invention and in some cases they can be prepared by processes similar to those described above. It is, however, preferable to prepare these compounds by special procedures, such as by the reaction of the imidazolidinone with phosphorous pentasulfide as described hereinafter in the examples.

The products of the present invention as tranquilizers can be incorporated in various pharmaceutical forms such as tablets, capsules, pills and so forth, for immediate or sustained release, by combining with suitable carriers. They may be in the form of dosage units for a single therapeutic dose or in small units for multiple dosages or in larger units for division into single doses. Obviously, in addition to the therapeutic tranquilizing compound there may be present excipients, binders, fillers and other therapeutically inert ingredients necessary in the formulation of the desired pharmaceutical preparation.

The following specific examples illustrate the preparation of representative 1-aryl-3-[(4-phenyl-1-piperazinyl) alkyl]-2-imidazolidinones and imidazolidinethiones of the present invention. Parts are by weight unless otherwise indicated.

EXAMPLE 1

*Preparation of 1-(m-chlorophenyl)-3-[2-(4-phenyl-1-piperazinyl)-ethyl]-2-imidazolidinone dihydrochloride*

A solution of 5.7 parts of 1-(m-chlorophenyl)-2-imidazolidinone in 100 parts of diglyme is added dropwise to a slurry of 1.6 parts of 50% sodium hydride (in mineral oil) in 25 parts of diglyme. The reaction mixture is stirred for one hour, and a solution of 8.0 parts of 1-(2-chloroethyl)-4-phenylpiperazine in 50 parts of ether is added. The reaction mixture is heated so as to gradually distill off the ether and then heated at reflux temperature for 3 hours. After cooling, the precipitate is filtered off, and the mother liquor is concentrated to remove the solvent. The residue is shaken with a mixture of benzene and dilute hydrochloric acid and the benzene layer is separated and discarded. The aqueous layer is treated with an excess of sodium hydroxide and extracted with benzene. The benzene layer is concentrated to a waxy residue, which is triturated with hexane and then filtered. On recrystallization from benzene and hexane 1 - (m-chlorophenyl) - 3 - [2 - (4-phenyl-1-piperazinyl) ethyl]-2-imidazolidinone, melting point 151°–152° C., is obtained. The base is converted to the dihydrochloride, melting point 213°–214° C.

EXAMPLE 2

*Preparation of 1-(m-bromophenyl)-3-[2-(4-phenyl-1-piperazinyl)-ethyl]-2-imidazolidinone*

The above compound is obtained when 1-(m-bromophenyl)-2-imidazolidinone is substituted for 1-(m-chlorophenyl)-2-imidazolidinone in the procedure of Example 1.

EXAMPLE 3

*Preparation of 1-(3-chloro-4-methylphenyl)-3-[2-(4-phenyl-1-piperazinyl)ethyl]-2-imidazolidinone*

When the procedure of Example 1 is followed and 1-(3-chloro-4-methylphenyl)-2-imidazolidinone is substituted for 1 - (m-chlorophenyl)- 2 -imidazolidinone, the above compound is obtained.

EXAMPLE 4

*Preparation of 1-(m-methoxyphenyl-)3-[2-(4-phenyl-1-piperazinyl)ethyl]-2-imidazolidinone*

The above compound, melting point 119°–120° C., is obtained when 1-(m-methoxyphenyl)-2-imidazolidinone is substituted for 1-(m-chlorophenyl)-2-imidazolidinone in the presence of Example 1.

EXAMPLE 5

*Preparation of 1-(m-chlorophenyl)-4-methyl-3-[4-(4-phenyl-1-piperazinyl)butyl]-2-imidazolidinone*

This compound is obtained when 1-(m-chlorophenyl)-4-methyl-2-imidazolidinone is reacted with 1-(4-chlorobutyl)-4-phenylpiperazine as described in Example 1.

EXAMPLE 6

*Preparation of 3-(p-fluorophenyl)-4-methyl-1-[3-(4-phenyl-1-piperazinyl)propyl]-2-imidazolidinone*

The above compound is formed when 1-(p-fluorophenyl)-5-methyl-2-imidazolidinone is reacted with 1-(3-chloropropyl)-4-phenyl piperazine by the procedure described in Example 1.

EXAMPLE 7

*Preparation of 1-(m-trifloromethylphenyl)-3-[2-(4-phenyl-1-piperazinyl)ethyl]-2-imidazolidinone*

When 1-(m-trifluoromethylphenyl) - 2-imidazolidinone is substituted for 1-(m-chlorophenyl)-2-imidazolidinone in the procedure of Example 1, the above compound is obtained.

EXAMPLE 8

*Preparation of 1-(3,5-dichlorophenyl)-3-[2-(4-phenyl-1-piperazinyl)ethyl]-2-imidazolidinone*

This compound is obtained when 1-(3,5-dichlorophenyl)-2-imidazolidinone is substituted for 1-(m-chlorophenyl)-2-imidazolidinone in the process of Example 1.

EXAMPLE 9

*Preparation of 1-(m-chlorophenyl)-3-[3-(4-phenyl-1-piperazinyl)propyl]-2-imidazolidinone hydrochloride*

A solution of 37 parts of 1-(m-chlorophenyl)-2-imidazolidinone in 250 parts of diglyme is added to a suspension of 11.5 parts of 50% sodium hydride (in mineral oil) in 100 parts of diglyme and the mixture is stirred for one hour. The reaction mixture is cooled, 38 parts of 1,3-dibromopropane is added and the mixture is stirred at room temperature for 18 hours. The solid is filtered off and the mother liquor is concentrated to remove the solvent. The residue is 1-(3-bromopropyl)-3-(m-chlorophenyl)-2-imidazolidinone.

A mixture of 23 parts of 1-phenylpiperazine and 15.2 parts of 1-(3-bromopropyl) - 3 - (m-chlorophenyl)-2-imidazolidinone in 50 parts of benzene is heated at reflux temperature overnight. One hundred parts of benzene is added and the mixture is extracted with sodium carbonate solution and then with water. The benzene layer is extracted with 80 parts of 5 N hydrochloric acid. The aqueous layer is made alkaline with 100 parts of 5 N sodium hydroxide solution and extracted with ether. The ether layer is concentrated and the residue is triturated with hexane and then with ether. The crystalline product, melting point 111°–113° C., is warmed with ethanolic hydrogen chloride until solution occurs. On cooling, 1-(m-chlorophenyl) - 3 - [3-(4-phenyl-1-piperazinyl)propyl]-2-imidazolidinone hydrochloride precipitates. The melting point after recrystallization again forms ethanol is 239°–241° C.

EXAMPLE 10

*Preparation of 1-(m-chlorophenyl) - 3 - [3-[4-(m-chlorophenyl)-1-piperazinyl]propyl] - 2 - imidazolidinone hydrochloride*

This compound, melting point 207–209° C., is obtained when 1-(m-chlorophenyl)piperazine is substituted for 1-phenylpiperazine in the procedure of Example 9.

EXAMPLE 11

*Preparation of 1-(m-chlorophenyl)-3-[3-[4-(p-methoxypenyl)-1-piperazinyl]propyl]-2-imidazolidinone*

When 1-(p-methoxphenyl)piperazine is substituted for 1-phenylpiperazine in the procedure of Example 9, the above compound is obtained having a melting point of 114°–115° C.

EXAMPLE 12

*Preparation of 1 - (m-chlorophenyl)-3-[3-[4-(m-trifluoromethylphenyl)-1-piperazinyl]propyl]-2-imidazolidinone*

If 1-(m-trifluoromethylphenyl)piperazine is substituted for 1-phenylpiperazine in the procedure of Example 9, this compound is isolated.

EXAMPLE 13

*Preparation of 1-(m-chlorophenyl)-3-[3-[4-(p-fluorophenyl)-1-piperazinyl]propyl]-2-imidazolidinone*

This compound is obtained when 1-(p-fluorophenyl)piperazine is substituted for 1-phenylpiperazine in the procedure of Example 9.

EXAMPLE 14

*Preparation of 1-(m-chlorophenyl)-3-[3-[4-(m-tolyl)-1-piperazinyl]propyl]-2-imidazolidinone*

The above compound is obtained when 1-(m-tolyl)piperazine is substituted for 1-phenylpiperazine in the process of Example 9.

EXAMPLE 15

*Preparation of 1-(m-chlorophenyl)-3-[3-[4-(m-bromophenyl)-1-piperazinyl]propyl]-2-imidazolidinone*

This compound is obtained when 1-(m-bromophenyl)piperazine is substituted for 1-phenylipiperazine in the procedure of Example 9.

EXAMPLE 16

*Preparation of 1-(m-chlorophenyl)-3-[3-[4-(p-chloropenyl)-1-piperazinyl]propyl]-2-imidazolidinone*

The above compound, melting point 154°–156° C., is obtained when 1-(p-chlorophenyl)piperazine is substituted for 1-phenylpiperazine in the procedure of Example 9.

EXAMPLE 17

*Preparation of 1-phenyl-3-[3-(4-phenyl-1-piperazinyl)propyl]-2-imidazolidinone hydrochloride*

A mixture of 2.5 parts of 1-(m-chlorophenyl)-3-[3-(4-phenyl-1-piperazinyl)propyl] - 2 - imidazolidinone hydrochloride (Example 8), 100 parts of 85% ethanol and 1 part of 10% palladium-on-carbon catalyst is shaken in a Parr hydrogenator under about three atmospheres of hydrogen pressure until reduction is complete. The catalyst is filtered off and the mother liquor is concentrated. The residue is triturated with 3 parts of 2.5 N ethanolic hydrochloric acid and 50 parts of ether. The crystalline product is filtered off and recrystallized from ethanol, melting point 241°–243° C.

EXAMPLE 18

*Preparation of 1-phenyl-3-[3-(4-phenyl-1-piperazinyl)propyl]-2-imidazolidinethione*

A mixture of 25 parts of 1-phenyl-3-[3-(4-phenyl-1-piperazinyl)propyl]-2-imidazolidinone, 25 parts of phosphorous pentasulfide, and 100 parts of xylene is heated in an oil bath at 155°–160° C. for 28 hours. After cooling, a mixture of 350 parts of 2 N sodium hydroxide solution and 200 parts of benzene is added. The mixture is warmed slightly to dissolve the gummy product and the layers are separated. The organic layers are washed with water and the desired product is then extracted into 250 parts of 1 N hydrochloric acid. The aqueous layer is made alkaline with 60 parts of 5 N sodium hydroxide and extracted with ether. The 1-phenyl - 3 - [3 - (4-phenyl-1-piperazinyl)propyl]-2-imidazolidinethione is recovered by concentration of the ether layer.

EXAMPLE 19

*Preparation of 1-(m-chlorophenyl)-3-[3-[4-(3,5-dichlorophenyl)-1-piperazinyl]propyl]-2-imidazolidinone*

The above compound is obtained when 1-(3,5-dichlorophenyl)piperazine is used in place of 1-phenylpiperazine in the procedure of Example 9.

EXAMPLE 20

*Preparation of 1-(m-chlorophenyl)-3-[3-(3-methyl-4-phenyl-1-piperazinyl)propyl]-2-imidazolidinone*

This compound is obtained when 2-methyl-1-phenylpiperazine is substituted for 1-phenylpiperazine in the procedure of Example 9.

We claim:
1. A member selected from the group consisting of compounds of the formula:

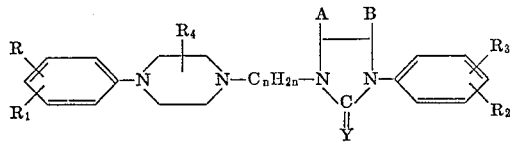

wherein R, $R_1$, $R_2$, and $R_3$ are selected from the group consisting of hydrogen, halogen, lower alkyl, lower alkoxy and trifluoromethyl, $R_4$, A and B are selected from the group consisting of hydrogen and lower alkyl groups, Y is selected from the group consisting of oxygen and sulfur, $n$ is an integer from 2 to 4 and pharmaceutically acceptable acid addition salts of said compounds.

2. The compound 1-(m-chlorophenyl)-3-[2-(4-phenyl-1-piperazinyl)ethyl]-2-imidazolidinone.
3. The compound 1-(m-bromophenyl)-3-[2-(4-phenyl-1-piperazinyl)ethyl]-2-imidazolidinone.
4. The compound 1-(3-chloro-4-methylphenyl)-3-[2-(4-phenyl - 1 - piperazinyl)ethyl]-2-imidazolidinone.
5. The compound 1-(m-methoxphenyl) - 3 - [2-(4-phenyl-1-piperazinyl)ethyl]-2-imidazolidinone.
6. The compound 1-(m-chlorophenyl)-4-methyl-3-[4-(4-phenyl-1-piperazinyl)butyl]-2-imidazolidinone.
7. The compound 3-(p-fluorophenyl)-4-methyl-1-[3-(4-phenyl-1-piperazinyl)propyl]-2-imidazolidinone.
8. The compound 1-(m-trifluoromethylphenyl)-3-[2-(4-phenyl-1-piperazinyl)ethyl]-2-imidazolidinone.
9. The compound 1-(3,5-dichlorophenyl - 3 - [2-(4-phenyl-1-piperazinyl)ethyl]-2-imidazolidinone.
10. The compound 1-(m-chlorophenyl) - 3 - [3-(4-phenyl-1-piperazinyl)propyl]-2-imidazolidinone.
11. The compound 1-(m-chlorophenyl)-3-[3-[4-(m-chlorophenyl)-1-piperazinyl]propyl]-2-imidazolidinone.
12. The compound 1-(m-chlorophenyl)-3-[3-[4-(p-methoxyphenyl)-1-piperazinyl]propyl]-2-imidazolidinone.
13. The compound 1-(m-chlorophenyl)-3-[3-[4-(m-trifluoromethylphenyl)-1-piperazinyl]propyl] - 2 - imidazolidinone.
14. The compound 1-(m-chlorophenyl) - 3 - [3-[4-(p-fluorophenyl)-1-piperazinyl]propyl]-2-imidazolidinone.
15. The compound 1-(m-chlorophenyl)-3-[3-[4-(m-tolyl)-1-piperazinyl]propyl]-2-imidazolidinone.
16. The compound 1-(m-chlorophenyl)-3-[3-[4-(m-bromophenyl)-1-piperazinyl]propyl]-2-imidazolidinone.
17. The compound 1-phenyl-3-[3-(4-phenyl-1-piperazinyl)propyl]-2-imidazolidinone.
18. The compound 1-phenyl-3-[3-(4-phenyl-1-piperazinyl)propyl]-2-imidazolidinethione.
19. The compound 1-(m-chlorophenyl)-3-[3-[4-(p-chlorophenyl)-1-piperzinyl]propyl]-2-imidazolidinone.

References Cited

UNITED STATES PATENTS 3,184,460  5/1965  Akkerman et al. ____ 260—309.7

OTHER REFERENCES

Elderfield: Heterocyclic Compounds, vol. 5 (19), pp. 250–251.

HENRY R. JILES, *Primary Examiner.*